United States Patent
Bull et al.

(10) Patent No.: US 10,740,365 B2
(45) Date of Patent: *Aug. 11, 2020

(54) GAP IDENTIFICATION IN CORPORA

(71) Applicant: INTERNATIONAL BUSINESS MACHINES CORPORATION, Armonk, NY (US)

(72) Inventors: Brendan C. Bull, Durham, NC (US); Scott R. Carrier, Apex, NC (US); Aysu Ezen Can, Cary, NC (US); Dwi Sianto Mansjur, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/622,762

(22) Filed: Jun. 14, 2017

(65) Prior Publication Data

US 2018/0365313 A1 Dec. 20, 2018

(51) Int. Cl.
*G06F 16/31* (2019.01)
*G06F 16/36* (2019.01)
*G06F 16/33* (2019.01)
*G06N 5/02* (2006.01)
(Continued)

(52) U.S. Cl.
CPC ........ *G06F 16/313* (2019.01); *G06F 16/3334* (2019.01); *G06F 16/36* (2019.01); *G06F 16/367* (2019.01); *G06F 16/374* (2019.01); *G06F 40/242* (2020.01); *G06F 40/247* (2020.01); *G06N 5/02* (2013.01)

(58) Field of Classification Search
CPC combination set(s) only.
See application file for complete search history.

(56) References Cited

U.S. PATENT DOCUMENTS

| | | | |
|---|---|---|---|
| 6,513,033 B1* | 1/2003 | Trauring | G06F 17/30737 |
| 7,376,551 B2* | 5/2008 | Powell | G06F 17/278 |
| | | | 704/4 |
| 7,555,472 B2 | 6/2009 | Craig et al. | |

(Continued)

OTHER PUBLICATIONS

Rosenthal et al., "Enterprise Discussion Analysis," CIKM '14, Nov. 3-7, 2014, Shanghai, China, Copyright 2014 ACM 978-1-2598—Jan. 14, 2011, pp. 1-4.

(Continued)

*Primary Examiner* — David T. Brooks
(74) *Attorney, Agent, or Firm* — Alexis N. Hatzis (57) ABSTRACT

Embodiments of the present invention disclose a method, a computer program product, and a computer system for identifying information gaps in corpora. A computer receives a document and extracts keywords from the document while filtering trivial keywords. The computer identifies and extracts top keywords detailed by the document using a topic modelling approach before determining whether the extracted top keywords exceed a threshold use frequency. Based on determining that the top keywords exceed a threshold use frequency, determining whether the top keywords have a relation to other entities within the document and, if so, determining whether the top keywords are defined within the document. Based on determining that the top keywords are not defined in the document, adding the top keywords to a list and defining the top keywords.

17 Claims, 6 Drawing Sheets

(51) Int. Cl.
*G06F 40/242* (2020.01)
*G06F 40/247* (2020.01)

(56) References Cited

U.S. PATENT DOCUMENTS

| | | | | |
|---|---|---|---|---|
| 7,730,009 | B1 | 6/2010 | Higgins et al. | |
| 9,342,233 | B1* | 5/2016 | Dimson | G06F 17/2735 |
| 9,378,459 | B2* | 6/2016 | Skiba | G06N 5/022 |
| 9,430,952 | B2 | 8/2016 | Bohra et al. | |
| 9,501,565 | B1* | 11/2016 | Ajmera | G06F 17/24 |
| 2004/0193870 | A1* | 9/2004 | Redlich | G06F 21/6245 |
| | | | | 713/154 |
| 2005/0106539 | A1* | 5/2005 | Bagley | G06F 17/30616 |
| | | | | 434/169 |
| 2005/0154690 | A1* | 7/2005 | Nitta | G06F 16/30 |
| | | | | 706/46 |
| 2006/0248049 | A1* | 11/2006 | Cao | G06F 17/30654 |
| 2007/0013967 | A1* | 1/2007 | Ebaugh | G06F 17/30613 |
| | | | | 358/448 |
| 2008/0089496 | A1* | 4/2008 | Chu | G06Q 10/107 |
| | | | | 379/100.08 |
| 2008/0091411 | A1* | 4/2008 | Williams | G06F 17/2795 |
| | | | | 704/9 |
| 2008/0091634 | A1* | 4/2008 | Seeman | G06N 5/022 |
| | | | | 706/59 |
| 2008/0177725 | A1* | 7/2008 | Bravery | G06F 17/30616 |
| 2009/0292689 | A1* | 11/2009 | Lee | G06F 17/30737 |
| 2009/0319518 | A1* | 12/2009 | Koudas | G06F 17/30696 |
| 2011/0004610 | A1* | 1/2011 | Rose | G06F 17/277 |
| | | | | 707/759 |
| 2011/0078191 | A1* | 3/2011 | Ragnet | G06F 17/30705 |
| | | | | 707/780 |
| 2012/0150533 | A1* | 6/2012 | O'Neill | G06F 16/24578 |
| | | | | 704/9 |
| 2013/0007607 | A1* | 1/2013 | Caldwell | G06F 17/2735 |
| | | | | 715/259 |
| 2013/0060808 | A1* | 3/2013 | Bao | G06F 16/93 |
| | | | | 707/769 |
| 2014/0058722 | A1* | 2/2014 | Sun | G06F 17/2735 |
| | | | | 704/9 |
| 2014/0067832 | A1* | 3/2014 | Lamba | G06F 17/2785 |
| | | | | 707/750 |
| 2014/0120513 | A1* | 5/2014 | Jenkins | G06F 17/27 |
| | | | | 434/362 |
| 2014/0297266 | A1* | 10/2014 | Nielson | A61B 5/162 |
| | | | | 704/9 |
| 2014/0316768 | A1* | 10/2014 | Khandekar | G06F 17/30654 |
| | | | | 704/9 |
| 2014/0325254 | A1* | 10/2014 | Mani | G06F 11/0793 |
| | | | | 714/2 |
| 2015/0100605 | A1* | 4/2015 | Golden | G06F 17/30958 |
| | | | | 707/798 |
| 2015/0332049 | A1* | 11/2015 | Chen | G06F 21/604 |
| | | | | 726/22 |
| 2016/0042299 | A1* | 2/2016 | Liang | G06F 3/04817 |
| | | | | 706/12 |
| 2016/0188566 | A1* | 6/2016 | Jifroodian-Haghighi | |
| | | | | G09B 5/02 |
| | | | | 704/10 |
| 2016/0224662 | A1 | 8/2016 | King et al. | |
| 2017/0060849 | A1* | 3/2017 | Allen | G06F 17/2785 |
| 2018/0068229 | A1* | 3/2018 | Srinivasan | G06N 7/005 |

OTHER PUBLICATIONS

Disclosed Anonymously, "Using a cognitive system to assemble multiple answers into a single response," An IP.com Prior Art Database Technical Disclosure, IP.com No. IPCOM000238536DIP.com, Electronic Publication Date: Sep. 3, 2014, pp. 1-4.

Disclosed Anonymously, "Technique for personalized question answering by orchestrating different system using corpus relevancy," An IP.com Prior Art Database Technical Disclosure, IP.com No. IPCOM000239698DIP.com, Electronic Publication Date: Nov. 26, 2014, pp. 1-4.

Disclosed Anonymously, "System for Visualizing and Influencing the Determining Factors for Answers from a Cognitive Question and Answer System," An IP.com Prior Art Database Technical Disclosure, IP.com No. IPCOM000247267DIP.com, Electronic Publication Date: Aug. 18, 2016, pp. 1-7.

Disclosed Anonymously, "System that detects correlations within unstructured information," An IP.com Prior Art Database Technical Disclosure, IP.com No. IPCOM000236605DIP.com, Electronic Publication Date: May 5, 2014, pp. 103.

Mell et al., "The NIST Definition of Cloud Computing", National Institute of Standards and Technology, U.S. Department of Commerce, Special Publication 800-145, Sep. 2011, pp. 1-7.

IBM: List of IBM Patents or Patent Applications Treated as Related (Appendix P), Feb. 5, 2018, pp. 1-2.

Bull et al., U.S. Pending U.S. Appl. No. 15/888,113, filed Feb. 5, 2018, titled "Gap Identification in Corpora,", pp. 1-39.

\* cited by examiner

Fig. 6

GAP IDENTIFICATION IN CORPORA

BACKGROUND

Unstructured text is an important source of information in question and answering systems for the reason that information extracted from the unstructured text is commonly utilized to answer a posed question. Because the quality of the question and answer system depends directly on the quality of its answers, understanding unstructured data and extracting as much information as possible from it is crucial to system performance. Chief to this process is the corpus itself containing the unstructured text. While corpora of higher quality yield higher quality answers, determining the quality of a corpus before run-time is not easy, as manual annotations are a labor intensive task

SUMMARY

Embodiments of the present invention disclose a method, a computer program product, and a computer system for information gap identification. A computer receives a document and extracts keywords from the document while filtering trivial keywords. The computer identifies and extracts top keywords detailed by the document using a topic modelling approach before determining whether the extracted top keywords exceed a threshold use frequency. Based on determining that the top keywords exceed a threshold use frequency, determining whether the top keywords have a relation to other entities within the document and, if so, determining whether the top keywords are defined within the document. Based on determining that the top keywords are not defined in the document, adding the top keywords to a list and defining the top keywords.

Embodiment of the present invention generally include a computer receiving a document, wherein the document may be a corpora of information containing files, folders, and the like. The present invention further includes the computer identifying one or more top keywords detailed by the document using a topic modelling approach. In at least one embodiment, the topic modelling approach comprises Latent Dirichlet Allocation. Embodiments further include the computer determining whether at least one top keyword of the one or more top keywords lacks a definition within the document; and based on determining that the at least one top keyword of the one or more top keywords lacks a definition within the document, the computer adding the at least one top keyword to a list. In at least one embodiment, the list is an information gap list and further comprises the computer defining the at least one top keyword.

In some of the disclosed embodiments, adding the at least one top keyword to the list is further based on the computer determining that the at least one top keyword has a relation to one or more entities detailed by the document. Moreover, determining whether the at least one keyword has a relation to one or more entities detailed by the document requires generating a knowledge graph corresponding to the document.

In additional embodiments of the present invention, adding the at least one top keyword to the list is further based on the computer determining that the at least one top keyword is not any of a stop word, a function word, and a named entity.

In yet further embodiments of the present invention, adding the at least one top keyword to the list is further based on the computer determining that the at least one top keyword is repeated within the document greater than a threshold number of times.

DETAILED DESCRIPTION

Figure 1:
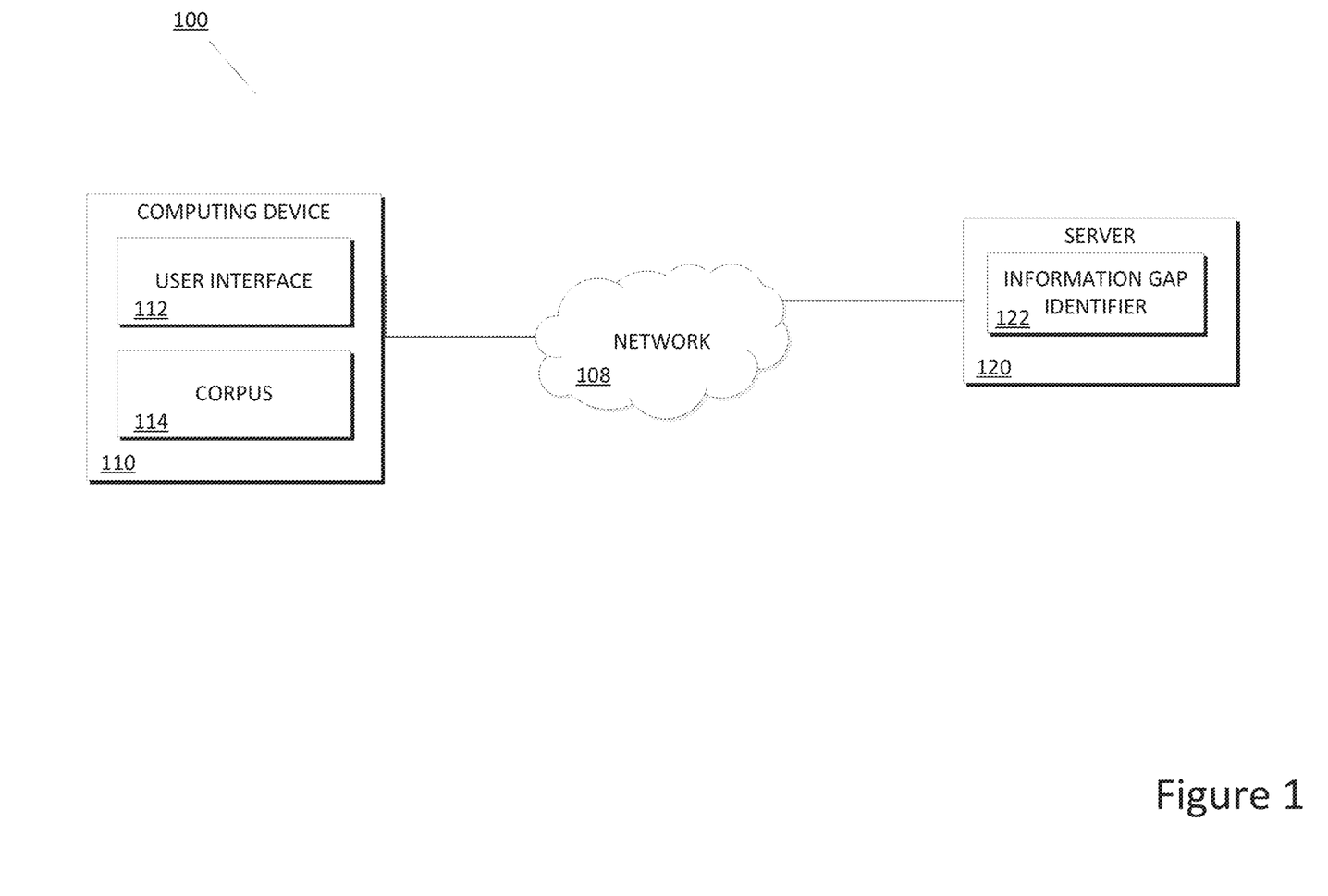
FIG. 1 is a schematic diagram of an information gap identification system 100, in accordance with an embodiment of the present invention.

An information gap identification system 100 in accordance with an embodiment of the invention is illustrated by FIG. 1. Embodiments of the present invention involve identifying undefined keywords within a corpus.

In the example embodiment, network 108 is a communication channel capable of transferring data between connected devices. In the example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or any combination thereof. In further embodiments, network 108 may be a Bluetooth network, a WiFi network, or a combination thereof. In yet further embodiments, network 108 may be a telecommunications network used to facilitate telephone calls between two or more parties comprising a landline network, a wireless network, a closed network, a satellite network, or any combination thereof. In general, network 108 can be any combination of connections and protocols that will support communications between computing device 110 and server 120.

In the example embodiment, computing device 110 includes user interface 112 and corpus 114. Computing device 110 may be a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 4.

User interface 112 is a software application which allows a user of computing device 110 to interact with computing device 110 as well as other connected devices via network 108. In addition, user interface 112 may be connectively coupled to hardware components, such as those depicted by FIG. 4, for receiving user input, including mice, keyboards, touchscreens, microphones, cameras, and the like. In the example embodiment, user interface 112 is implemented via a web browsing application containing a graphical user interface (GUI) and display that is capable of transferring data files, folders, audio, video, hyperlinks, compressed data, and other forms of data transfer individually or in bulk. In other embodiments, user interface 112 may be implemented via other integrated or standalone software applications and hardware capable of receiving user interaction and communicating with other electronic devices.

Corpus 114 is a collection of information contained in files, folders, and other document types. In the example embodiment, corpus 114 may be a corpora of documents which detail bodies of categorized and subject specific data, such as medical, legal, and financial data. In other embodiments, corpus 114 may include uncategorized data of miscellaneous topics. In the example embodiment, corpus 114 may be structured (i.e. have associated metadata), partially structured, or unstructured. Moreover, data within corpus 114 may be written in programming languages of common file formats such as .docx, .doc, .pdf, .rtf, etc. In further embodiments, corpus 114 may include handwritten and other documents scanned or otherwise converted into electronic form.

In the example embodiment, server 120 includes information gap identifier 122. Server 120 may be a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While server 120 is shown as a single device, in other embodiments, server 120 may be comprised of a cluster or plurality of computing devices, working together or working separately. Server 120 is described in more detail with reference to FIG. 4.

In the example embodiment, information gap identifier 122 is a software application capable of receiving a corpus and extracting terms therein. In addition, information gap identifier 122 is capable of filtering trivial terms from the list of extracted terms as well as identifying and categorizing keywords within the extracted terms. Information gap identifier 122 is further capable of determining the most frequently used keywords and determining whether the most frequently used keywords are related to other entities within the corpus. Based on determining that a frequently used keyword is related to other entities detailed by the corpus, information gap identifier 122 may determine whether the frequently used keyword is undefined by the corpus and, if so, adding the keyword to a list of undefined keywords. Information gap identifier 122 is lastly capable of defining the top keywords on the information gap list.

Figure 2:
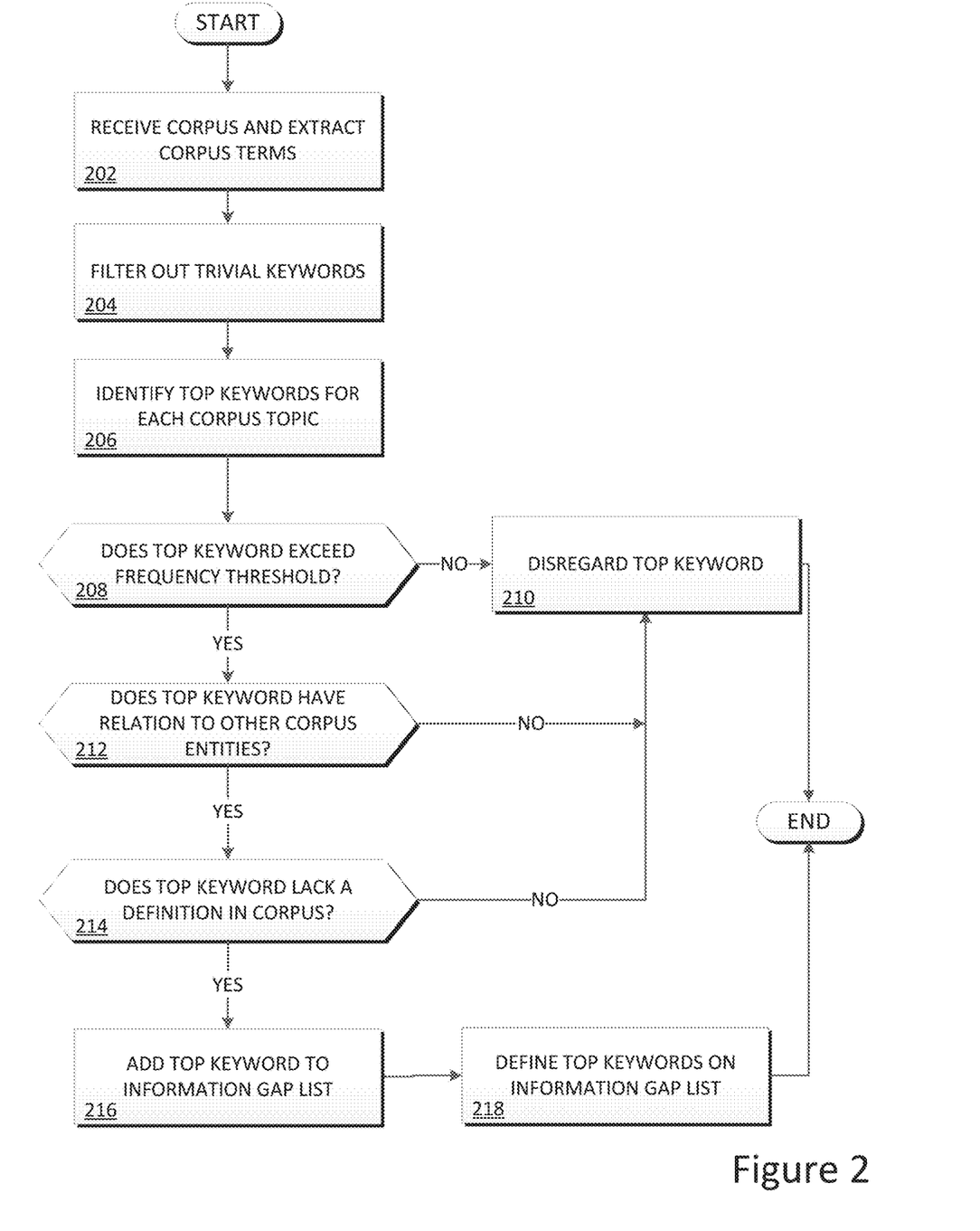
FIG. 2 illustrates the operations of information gap identifier 122 of information gap identification system 100 in identifying and defining undefined keywords of a corpus, in accordance with an embodiment of the present invention.

FIG. 2 illustrates the operations of information gap identifier 122 of information gap identification system 100 in identifying undefined keywords within corpora.

Information gap identifier 122 receives corpus 114 and extracts terms within corpus 114 text (step 202). In the example embodiment, information gap identifier 122 receives corpus 114 remotely from user of computing device 110 via user interface 112 and network 108. In other embodiments, however, information gap identifier 122 may retrieve/receive corpus 114 remotely from another computing/storage device, or alternatively receive/retrieve corpus 114 locally from storage on server 120. In the example embodiment, information gap identifier 122 extracts terms found within corpus 114 using data analysis techniques, such as metadata inspection, dictionary lookup, and entity detection. In embodiments involving handwritten corpus 114, information gap identifier 122 employs pixel analysis techniques such as optical character recognition. In other embodiments, alternative methods of term extraction and natural language processing may be employed.

With reference to an illustrative example, if a user wishes to define undefined terms in corpora 114 which details an automatic transmission and a powertrain, then information gap identifier 122 receives corpus 114 comprising the following two paragraphs:

"An automatic transmission, also called auto, self-shifting transmission, n-speed automatic (where n is its number of forward gear ratios), or AT, is a type of motor vehicle transmission that can automatically change gear ratios as the vehicle moves, freeing the driver from having to shift gears manually. Like other transmission systems on vehicles, it allows an internal combustion engine, best suited to run at a relatively high rotational speed, to provide a range of speed and torque outputs necessary for vehicular travel. The number of forward gear ratios is often expressed for manual transmissions as well (e.g., 6-speed manual). The next significant phase in the automatic transmission's development occurred in 1908 with the introduction of Henry Ford's remarkable Model T.

"Powertrain development for diesel engines involves the following: exhaust gas recirculation (EGR), and advanced combustion. Spark ignition engine development include: fuel injection, including the gasoline direct injection variant, as well as improving volumetric efficiency by using multi-valves per cylinder, variable valve timing, variable length intake manifolds, and turbocharging. Changes also include new fuel qualities (no sulphur and aromates) to allow new combustion concepts. So-called "combined combustion systems" (CCV) or "diesotto" cycles are based on synthetic fuels (synthetic diesel, biomass to liquid (BTL) or gas to liquid (GTL)). In automotive manufacturing, the frame plus the "running gear" makes the chassis."

Information gap identifier 122 filters trivial terms from corpus 114 (step 204). In the example embodiment, trivial terms include stop words, function words, named entities, and other terms which are not likely to contribute to a meaning of an undefined term. A stop word is a commonly used term, for example "the," that a computer application is programmed to ignore as being meaningless, both when indexing entries for searching and when retrieving them as the result of a search query. Because little value is extracted from stop words in natural language processing, information gap identifier 122 is programmed to ignore stop words when searching for keywords of corpus 114. Similarly, function words are ignored because function words generally signal a grammatical relationship which, again, provide little meaning to the terms found within corpus 114. Moreover, information gap identifier 122 also ignores named entities within corpus 114. A named entity is a real word object, such as a person, location, organization, product, and the like, which is already associated with a definition and, therefore, in most cases requires no further defining. In the example embodiment, information gap identifier 122 identifies stop words, function words, and named entities using a concept filtering technique in conjunction with reference to online and offline databases detailing known stop words, function words, and named entities. In one embodiment, for example, information gap identifier 122 may utilize an online databases such as Project Gutenberg, the largest single collection of free electronic books, to provide hundreds of thousands of text to train models, archive stop/function words, archive named entities, and the like. In addition, information gap identifier 122 may perform named entity recognition (NER) and other entity identification techniques such as entity chucking and entity extraction. While in the example embodiment trivial words are filtered out at the outset of operation to increase computational efficiency, trivial words may be filtered at other times of operation in other embodiments, such as after generating a knowledge graph.

With reference to the previously introduced example corpus 114, information gap identifier 122 filters the following stop words, function words, and named entities from the following sentence (indicated with italics): "An *automatic* transmission, *also called* auto, self-shifting transmission, n-speed automatic (*where* n *is its* number *of* forward gear ratios), *or* AT, *is a* type *of* motor vehicle transmission *that can* automatically change gear ratios *as the* vehicle moves, freeing *the* driver *from having to* shift gears manually."

Information gap identifier 122 identifies top keywords for each topic found within corpus 114 (step 206). In the example embodiment, information gap identifier 122 identifies top keywords for each topic found within corpus 114 using a topic modelling approach. Topic modelling is a type of statistical model for discovering abstract topics that occur in a collection of documents. Topic modelling creates topics by essentially clustering similar words in a document and operates on the intuitive assumption that a document about a particular topic contains more terms related to the topic than those which are not. In addition, it assumes that the words that share the same topic are seen close to each other. For example, a document which is 90% about dogs and 10% about cats likely contains nine times more dog related terms than cat related terms. Conversely, topics lacking a relation or special relevance to the particular document topic, such as "is," will appear equally whether the document topic is dogs or cats.

Topic modelling captures this intuition in a mathematical framework which allows for examining of a set of documents and discovering, based on the statistics of the words in each, what the topics might be and the balance of topics for each document (step 206 continued). One such approach of topic modelling is Latent Dirichlet Allocation, or LDA topic modelling. LDA topic modelling is a generative statistical model that allows sets of observations to be explained by unobserved groups that explain why some parts of the data are similar. Unlike other methods of topic modelling, however, LDA operates under the assumption that the topic distribution has a sparse Dirichlet prior, which encodes the intuition that documents cover only a small set of topics and that topics use only a small set of terms frequently. Using a topic modelling approach, information gap identifier 122 is capable of identifying both the most common, or top, keywords of a document and, based on the topics to which those keywords belong which, the most common topics of the document.

Continuing the previously introduced example regarding automatic transmissions and powertrains, if information gap identifier 122 applies topic modelling to corpus 114, then information gap identifier 122 identifies a first topic comprising the top keywords "automatic transmission," "internal combustion engine," "speed," "manual," and "transmission," as well as a second topic comprising the top keywords "powertrain diesel," "diesel," "gas," "combustion," "running gear," and "chassis."

Information gap identifier 122 determines whether the top keywords equals or exceeds a frequency of use threshold (decision 208). In the example embodiment, information gap identifier 122 determines a use frequency of the top keywords in corpus 114 as a measure of the importance of a particular top keyword. Specifically, more frequent use or frequent use in a close proximity of a top keyword within corpus 114 implies a greater importance of the particular keyword in the subject matter detailed by corpus 114. In the example embodiment, the frequency threshold is user input, however in other embodiments a default frequency may be determined based on other factors. For instance, the threshold frequency may be defined as five percent or more of the total amount of words in corpus 114 Alternatively, the threshold frequency may be five percent or more of the total or average amount of words per identified topic. Other methods may incorporate other factors, such as applying an emphasis to an amount of keywords within a specific proximity of one another, for example within a sentence or paragraph, as well as rules for specific topics/domains detailed by corpus 114 and weighted rankings.

Continuing the previously introduced example where corpus 114 contains only two paragraphs, if information gap identifier 122 requires a user-input use threshold of one or more instances per keyword, then information gap identifier 122 maintains the identified top keywords of "automatic transmission," "internal combustion engine," "speed," "manual," "transmission," "powertrain diesel," "diesel," "gas," "combustion," "running gear," and "chassis" because each of the top keywords are used at least once.

If information gap identifier 122 determines that a top keyword fails to exceed the frequency threshold (decision 208 "NO" branch), then information gap identifier 122 disregards the top keyword (step 210). As previously mentioned, keywords which fail to exceed the frequency threshold are deemed irrelevant to extracting information from corpus 114. However, in other embodiments, information gap identifier 122 may consider all terms of corpus 114, regardless of whether the top keyword exceeds any threshold.

With reference again to the example introduced earlier, if information gap identifier 122 requires a user-input use threshold of five instances, then information gap identifier 122 disregards the top keywords "automatic transmission," "internal combustion engine," "speed," "manual," "transmission," "powertrain diesel," "diesel," "gas," "combustion," "running gear," and "chassis" because none of the top keywords are used within the two paragraph corpus 114 more than five times.

Figure 3:
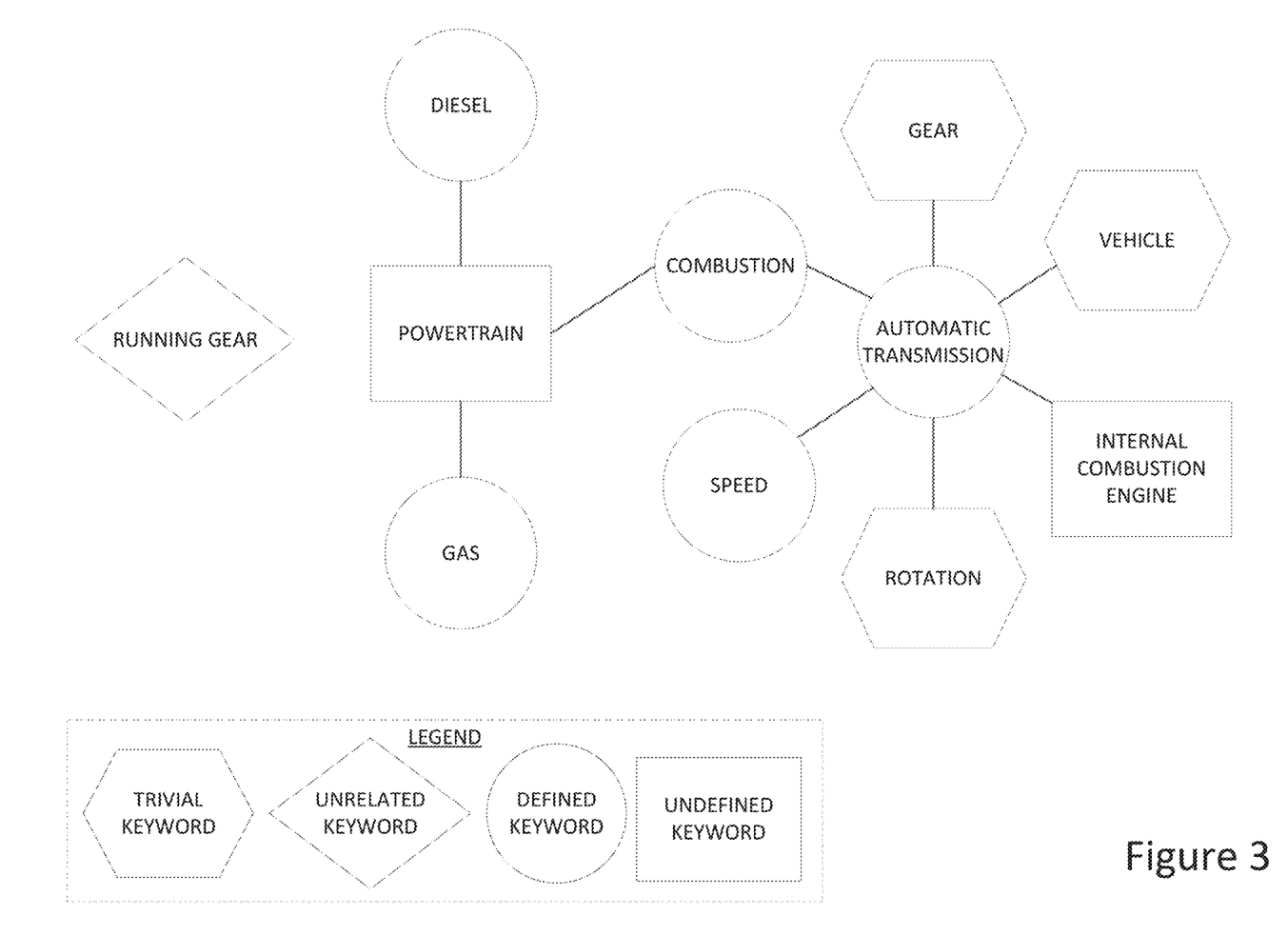
FIG. 3 illustrates a knowledge graph, in accordance with an embodiment of the present invention.

If information gap identifier 122 determines that a top keyword exceeds the frequency threshold (decision 208 "YES" branch), then information gap identifier 122 determines whether the remaining top keywords have a relation to other corpus 114 entities (decision 212). Similar to the keyword use frequency determination made above, information gap identifier 122 determines whether the identified top keywords have relations, or connections, to other entities in corpus 114 as a measure of the importance of the particular top keyword with respect to corpus 114. Top keywords which are more commonly or more closely related to other entities of corpus 114 are deemed more likely to add meaningful value to information extracted from corpus 114. In other embodiments, however, information gap identifier 122 may seek definitions for all top keywords regardless of identifiable relations. In the example embodiment, information gap identifier 122 determines whether the top keywords have relations to other corpus 114 entities by generating a knowledge graph. FIG. 3 depicts a knowledge graph wherein lines, or links, are used to represent relationships in text. In the example embodiment, the links between entities in text may be based on known relationships derived and archived in online databases or derived in real time based on context within corpus 114. In the example embodiment, information gap identifier 122 generates a knowledge graph containing all terms within corpus 114 and determines which of the top keywords (omitting filtered trivial keywords and keywords not exceeding the use threshold) have relations with other entities by cross referencing the top keywords with the knowledge graph. In the example embodiment, those top keywords which have relations to other entities of corpus 114, denoted visually with a line in FIG. 3, are deemed important enough to corpus 114 to require a definition.

With reference now to the previously introduced example as well as FIGS. 2 and 3, if information gap identifier 122 generates a knowledge graph for the top keywords previously identified, then information gap identifier 122 determines relations between the top keywords as illustrated by FIG. 3. FIG. 3 is explained with more detail in the proceeding paragraphs.

Returning to FIG. 2, if information gap identifier 122 determines that a top keyword does not have a relation to other corpus 114 entities (decision 212 "NO" branch), then information gap identifier 122 disregards the top keyword (step 210).

Continuing the example above and with reference to both FIG. 2 and FIG. 3, if information gap identifier 122 determines that "running gear" has no relation to other entities of corpus 114, then information gap identifier 122 disregards the top keyword "running gear."

Returning to FIG. 2, if information gap identifier 122 determines that a top keyword has a relation to other corpus 114 entities (decision 212 "YES" branch), then information gap identifier 122 determines whether the remaining top keywords lack a definition within corpus 114 (decision 214). In the example embodiment, information gap identifier 122 deems keywords which appear frequently and maintain relations with other corpus 114 entities as valuable to information extracted from the unstructured text of corpus 114. Accordingly, information gap identifier 122 determines whether said top keywords maintain corresponding definitions within corpus 114 to ultimately extract more thorough information from corpus 114. In the example embodiment, definitions corresponding to the remaining top keywords are identified using techniques such as template matching and syntax analysis. For example, information gap identifier 122 may search for language that matches templates such as "X is a Y," "X can be defined by Y," and "where X is Y" to define top keyword, X, using Y. Other methods may include other templates, reasoning algorithms, parsing engines, and natural language processing techniques.

Returning to FIG. 2, if information gap identifier 122 determines that a top keyword does not lack a definition in corpus 114 (decision 214 "NO" branch), then information gap identifier 122 disregards the top keyword as already having a definition (step 210).

Continuing the example above introduced above and with reference again to FIGS. 2 and 3, if information gap identifier 122 analyses the sentence of corpus 114 stating "An automatic transmission . . . is a type of motor vehicle transmission that can automatically change gear ratios as the vehicle moves, freeing the driver from having to shift gears manually," then information gap identifier 122 determines that "automatic transmission" is defined within corpus 114 and disregards "automatic transmission" as a top keyword.

With reference to FIG. 2, if information gap identifier 122 determines that a top keyword lacks a definition in corpus 114 (decision 214 "YES" branch), then information gap identifier 122 adds the top keyword to an information gap list (step 216). In the example embodiment, the information gap list includes all top keywords of corpus 114 which lack definitions.

Continuing the example above and again with reference to FIG. 2 and FIG. 3, if information gap identifier 122 determines that no template matches any uses of the term "powertrain" within corpus 114, the information gap identifier 122 determines that "powertrain" lacks a definition and adds "powertrain" to the information gap list. Similarly, if information gap identifier 122 determines that "internal combustion engine" does not match a template, information gap identifier 122 adds "internal combustion engine" to the information gap list.

Returning to FIG. 2, information gap identifier 122 defines the top keywords on the information gap list (step 218). In the example embodiment, information gap identifier 122 defines the top keywords on the information gap list by searching online databases for a corresponding definition. In other embodiments, information gap identifier 122 may prompt a user or author of corpus 114 for a definition associated with the top keywords on the information gap list. In further embodiments, information gap identifier 122 may input a top keyword, X, into a template such as "What is the definition of X?" and transmit the question to a question and answer service. This further embodiment may include questions which include a context of the undefined top keyword on the information gap list. For example, information gap identifier 122 may incorporate the topics detailed by corpus 114, Y, in a question such as "What is the definition of X in the context of Y?" In embodiments of the present invention, different methods and combinations of the above methods for defining terms on the information gap list may be employed. When identifying conflicting definitions, information gap identifier 122 may then rank the received definitions using a variety of reasoning algorithms and determine a most likely definition. Information gap identifier 122 may be configured to then select an appropriate definition autonomously under certain circumstances, for example if a confidence exceeds a threshold or the confidence in one definition exceeds a confidence of the next best definition by a threshold, or alternatively prompt a user to select an appropriate definition. In the example embodiment, definitions obtained for the undefined top keywords may be stored in associated with the top keywords by way of metadata or separate associated files such that corpus 114 is not altered by the definitions proffered by information gap identifier 122.

Continuing the example introduced above, if the information gap list contains the top keywords "powertrain" and "internal combustion engine," then information gap identifier 122 searches online databases for a corresponding definition. Upon identification of one or more definitions of "powertrain" and "internal combustion engine," information gap identifier 122 may then rank the potential definitions and select the most appropriate or allow a user to select the appropriate definition.

FIG. 3 illustrates a knowledge graph generated by information gap identifier 122. As depicted in FIG. 3, top keywords illustrated within a hexagon are considered trivial and removed by information gap identifier 122 within the filtering stage, for example named entities, functions words, and stop words. It should be noted that while trivial keywords are filtered at the outset of operation to increase computational efficiency in the example embodiment, trivial keywords are illustrated in FIG. 3 nonetheless for purposes of illustrating other embodiments wherein filtering trivial keywords is done at a later time or used in analysis. Similarly, FIG. 3 illustrates top keywords information gap identifier 122 deems unrelated keywords, i.e. top keywords which have no link to other entities on the knowledge graph, within a diamond. In addition, FIG. 3 illustrates top keywords which are defined within a circle, while depicting undefined keywords within a square. In the example embodiment, the top keywords within a square are added to the information gap list and defined.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

Figure 4:
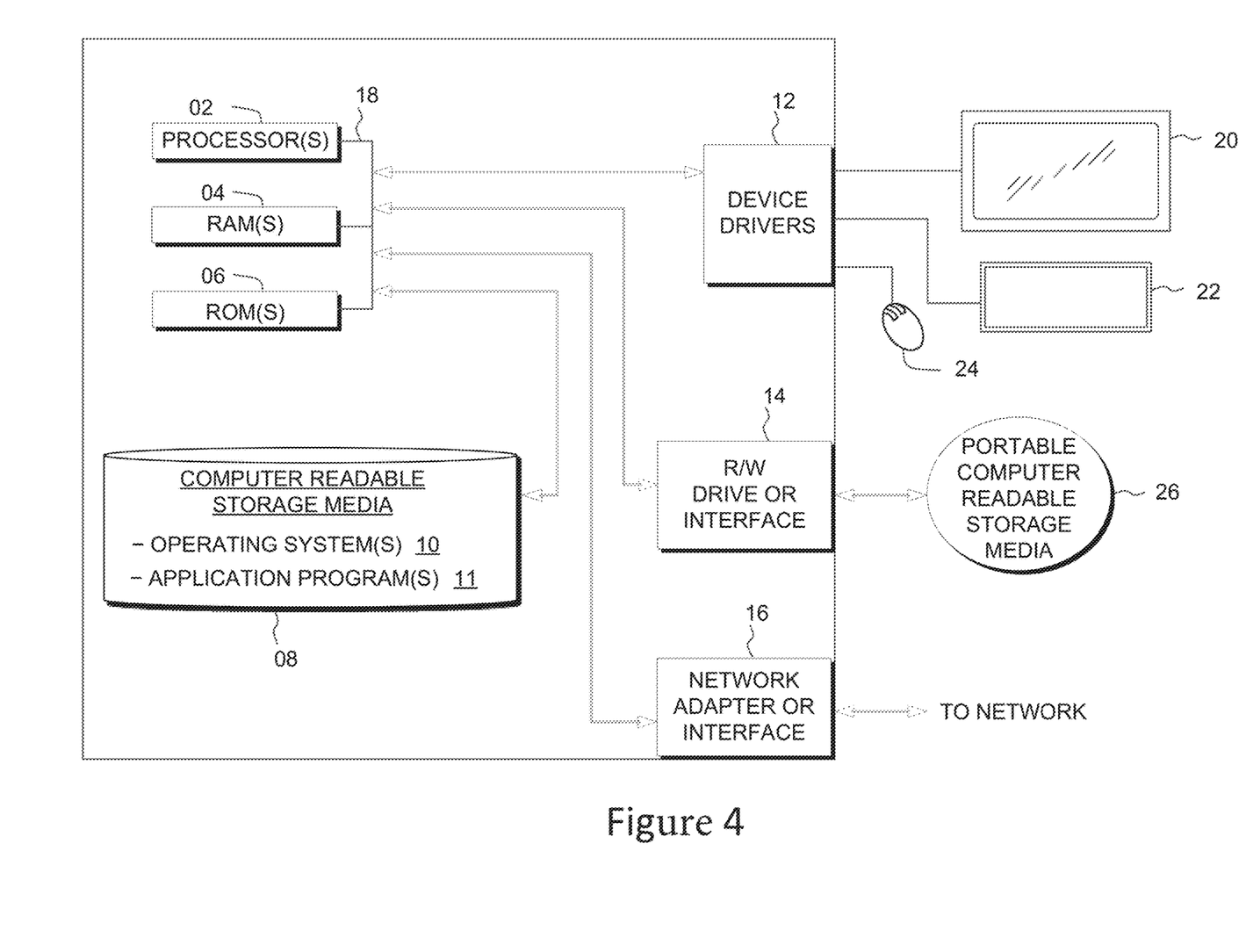
FIG. 4 is a block diagram depicting the hardware components of an information gap identifying system 100 of FIG. 1, in accordance with an embodiment of the invention.

FIG. 4 depicts a block diagram of computing device 110 and/or server 120 of the information gap identification system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example information gap identifier 122, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
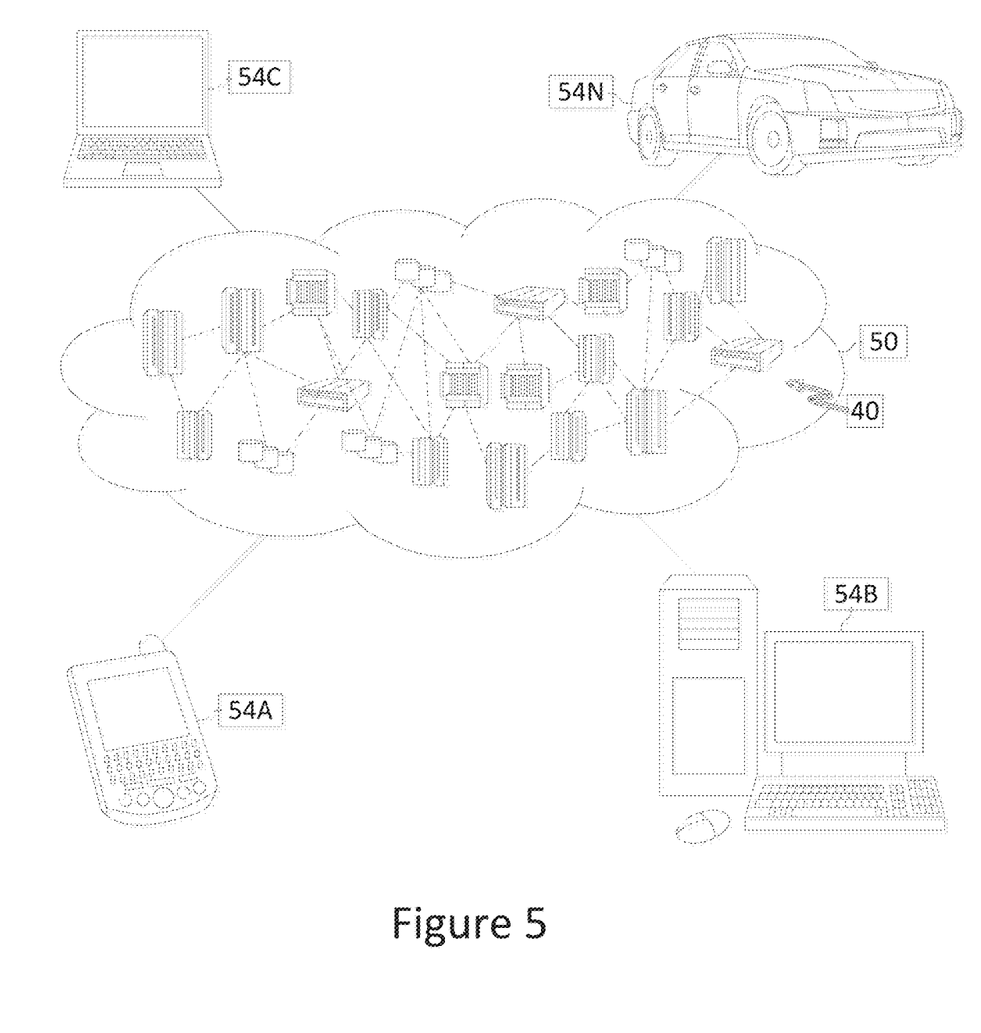
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
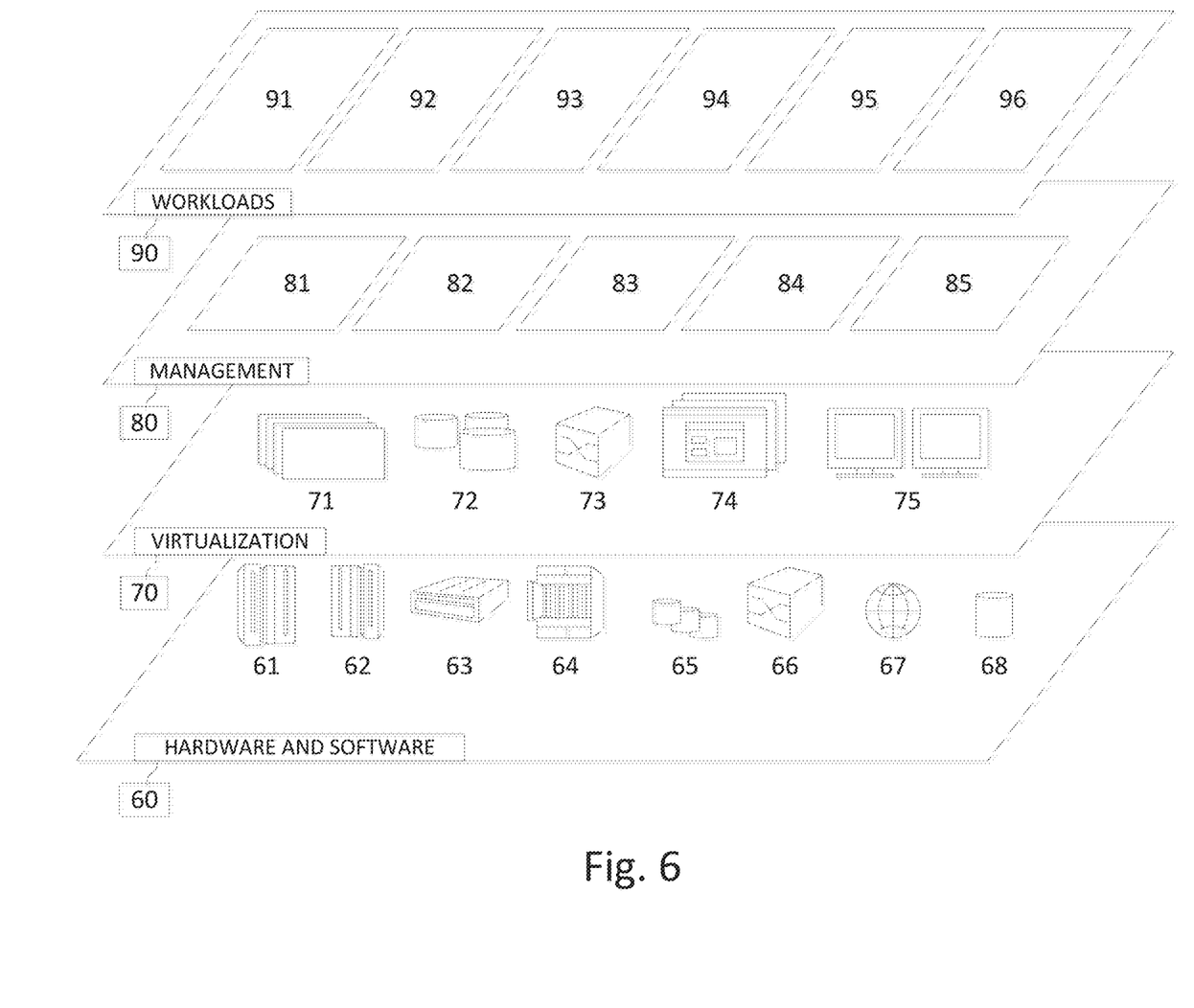
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and information gap processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of identifying information gaps in corpora, wherein the method comprises:
   a computer receiving a document comprising a handwritten portion from a user via a scanning interface of a computing device of the user;
   the computer identifying one or more top keywords within the document, using a pixel analysis technique, wherein the one or more top keywords are the most common substantive words in the document;
   the computer determining whether at least one top keyword of the one or more top keywords lacks a definition within the document by searching for language that matches a template;
   based on determining that the at least one top keyword of the one or more top keywords lacks a definition within the document, and further based on determining, using one or more online databases and entity identification techniques, that the at least one top keyword is not any of a stop word, a function word, and a named entity, the computer adding the at least one top keyword to a list; and
   based on adding the at least one top keyword to the list, the computer prompting the user via a user input for the definition of the at least one top keyword, given a context within the document, and the computer generating a knowledge graph corresponding to the document, wherein the knowledge graph identifies relations between the one or more top keywords, wherein the relations include whether the one or more top keywords are defined, undefined, and unrelated.

2. The method of claim 1, further comprising:
   the computer defining the at least one top keyword.

3. The method of claim 1, wherein adding the at least one top keyword to the list is further based on:
   the computer determining that the at least one top keyword has a relation to one or more entities within the document.

4. The method of claim 3, wherein determining that the at least one keyword has a relation to one or more entities within the document further comprises:
   the computer generating the knowledge graph corresponding to the document.

5. The method of claim 1, wherein adding the at least one top keyword to the list is further based on:
   the computer determining that the at least one top keyword is repeated within the document greater than a threshold number of times.

6. The method of claim 1, wherein identifying one or more top keywords within the document is performed using Latent Dirichlet Allocation topic modelling.

7. A computer program product for identifying information gaps in corpora, the computer program product comprising:
   one or more computer-readable storage media and program instructions stored on the one or more computer-readable storage media, the program instructions comprising:
   program instructions to receive a document by a computer comprising a handwritten portion from a user via a scanning interface of a computing device of the user;
   program instructions to identify one or more top keywords within the document, using a pixel analysis technique, wherein the one or more top keywords are the most common substantive words in the document;
   program instructions to determine whether at least one top keyword of the one or more top keywords lacks a definition within the document;
   based on determining that the at least one top keyword of the one or more top keywords lacks a definition within the document, and further based on determining, using one or more online databases and entity identification techniques, that the at least one top keyword is not any of a stop word, a function word, and a named entity, program instructions to add the at least one top keyword to a list; and
   based on adding the at least one top keyword to the list, the computer prompting the user via a user input for the definition of the at least one top keyword, given a context within the document, and the computer generating a knowledge graph corresponding to the document, wherein the knowledge graph identifies relations between the one or more top keywords, wherein the relations include whether the one or more top keywords are defined, undefined, and unrelated.

8. The computer program product of claim 7, further comprising:
   program instructions to define the at least one top keyword.

9. The computer program product of claim 7, wherein adding the at least one top keyword to the list is further based on:
   program instructions to determine that the at least one top keyword has a relation to one or more entities within the document.

10. The computer program product of claim 9, wherein determining that the at least one keyword has a relation to one or more entities within the document further comprises:
    program instructions to generate the knowledge graph corresponding to the document.

11. The computer program product of claim 7, wherein adding the at least one top keyword to the list is further based on:
    program instructions to determine that the at least one top keyword is repeated within the document greater than a threshold number of times.

12. The computer program product of claim 7, wherein identifying one or more top keywords within the document is performed using Latent Dirichlet Allocation topic modelling.

13. A computer system for identifying information gaps in corpora, the computer system comprising:
    one or more computer processors, one or more computer-readable storage media, and program instructions stored on one or more of the computer-readable storage media for execution by at least one of the one or more processors, the program instructions comprising:
    program instructions to receive a document by a computer comprising a handwritten portion from a user via a scanning interface of a computing device of the user;
    program instructions to identify one or more top keywords within the document, using a pixel analysis technique, wherein the one or more top keywords are the most common substantive words in the document;
    program instructions to determine whether at least one top keyword of the one or more top keywords lacks a definition within the document;
    based on determining that the at least one top keyword of the one or more top keywords lacks a definition within the document, and further based on determining, using one or more online databases and entity identification techniques, that the at least one top keyword is not any of a stop word, a function word, and a named entity, program instructions to add the at least one top keyword to a list; and based on adding the at least one top keyword to the list, the computer prompting the user via a user input for the definition of the at least one top keyword, given a context within the document, and the computer generating a knowledge graph corresponding to the document, wherein the knowledge graph identifies relations between the one or more top keywords, wherein the relations include whether the one or more top keywords are defined, undefined, and unrelated.

14. The computer system of claim 13, further comprising: program instructions to define the at least one top keyword.

15. The computer system of claim 13, wherein adding the at least one top keyword to the list is further based on:
program instructions to determine that the at least one top keyword has a relation to one or more entities within the document.

16. The computer system of claim 15, wherein determining that the at least one keyword has a relation to one or more entities within the document further comprises:
program instructions to generate the knowledge graph corresponding to the document.

17. The computer system of claim 13, wherein adding the at least one top keyword to the list is further based on:
program instructions to determine that the at least one top keyword is repeated within the document greater than a threshold number of times.

* * * * *